H. JOHN.
SHEARING APPARATUS FOR ROLLED IRON, &c.
APPLICATION FILED NOV. 27, 1907.
919,874.
Patented Apr. 27, 1909.
2 SHEETS—SHEET 2.
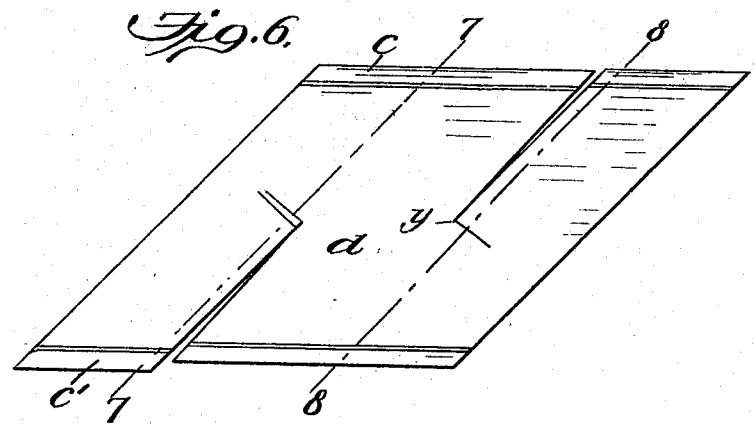
 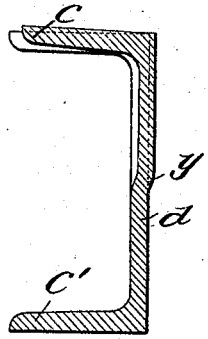 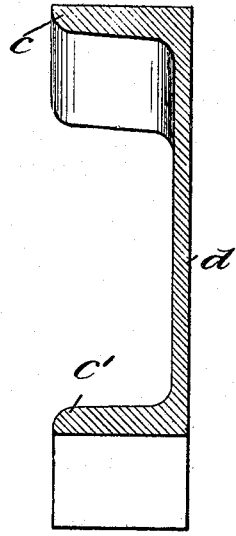
Witnesses:
Inventor
Hugo John
By
James L. Norris.
Atty.

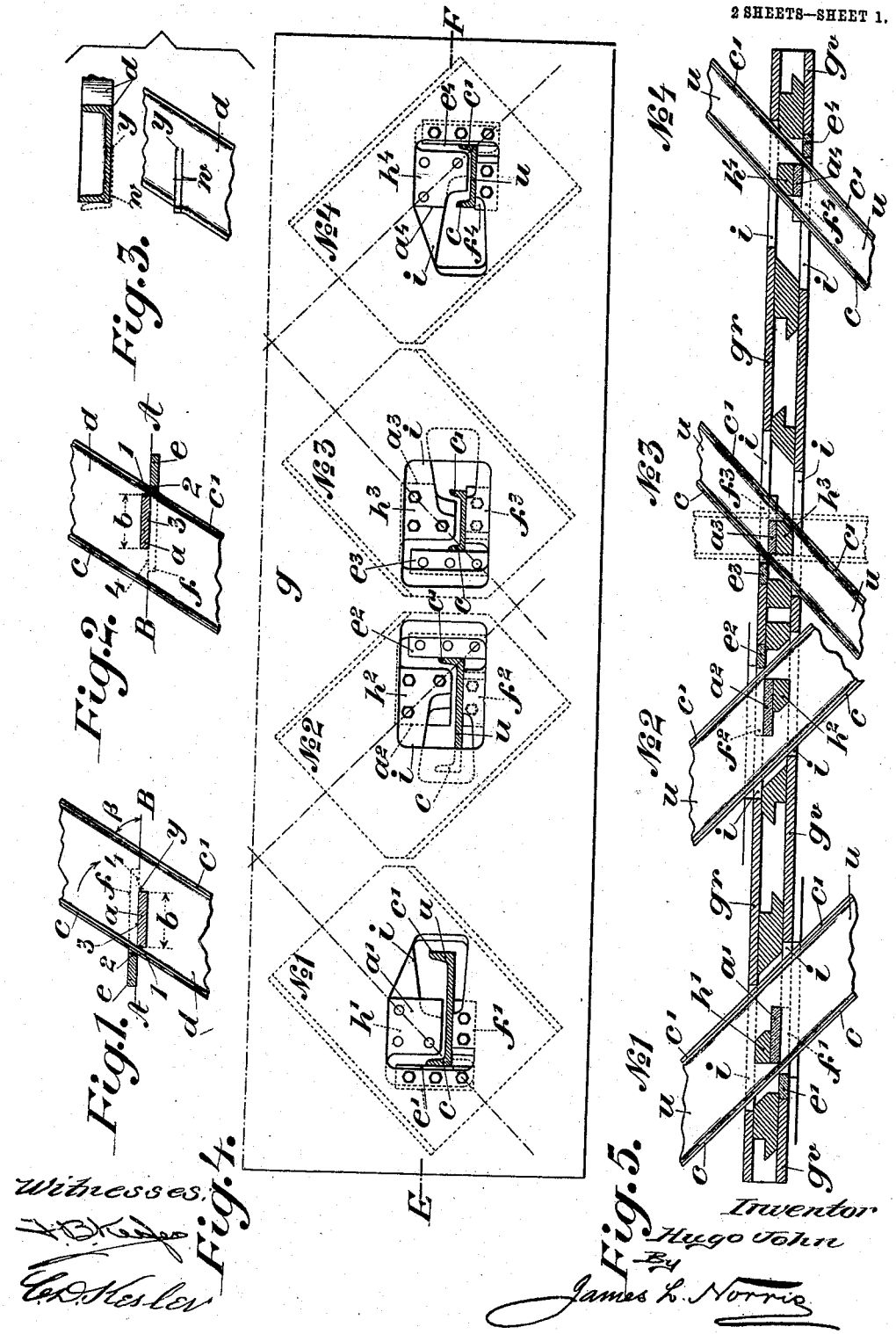

UNITED STATES PATENT OFFICE.

HUGO JOHN, OF ERFURT, GERMANY.

SHEARING APPARATUS FOR ROLLED IRON, &c.

No. 919,874.  Specification of Letters Patent.  Patented April 27, 1909.

Application filed November 27, 1907. Serial No. 404,137.

*To all whom it may concern:*

Be it known that I, HUGO JOHN, manufacturer, a subject of the King of Prussia, German Emperor, residing at Erfurt, Kingdom of Prussia, German Empire, have invented certain new and useful Improvements in or Relating to Shearing Apparatus for Rolled Iron and the Like, of which the following is a specification.

The present invention relates to improvements in apparatus for cutting iron girders having double flanges and especially U or channel irons, the apparatus being capable of cutting the iron either at right angles to its length or at any other desired angle, the cutting operation being effected by detaching or separating each half of the U or channel iron in one operation, that is to say, the straight or angular cut is completed in two consecutive cuts or operations. The device is provided in the well known manner with a stationary lateral cutter, a horizontal bottom cutter which is also stationary, and a single upper cutter which is movable at an angle of 45° relatively to the lateral and bottom cutters and having two cutting edges which are parallel to the lateral and bottom cutters. The cutting edges of all of these cutters are in the same vertical plane, and the cutters during the shearing action engage throughout the extent of their flat cutting surfaces with the U or channel iron as distinguished from such apparatus wherein the cutting edges are wedge-shaped and which operate to bite off the iron.

An essential feature of the present invention which distinguishes it from other cutting apparatus is, that the adjustable upper cutter is not carried to the level of the cutting edges of the lateral and bottom cutters and then carried past them, but on the other hand, such upper cutter is caused to penetrate the iron only to such a depth sufficient to permit the pressure exerted upon the web and flange to effect the separation. During such cutting operation, the cutting of the U or channel iron whether straight or at an angle is effected in two consecutive operations, one-half of the web and the adjoining flange being separated during the first cut while the second half of the web and the opposite flange are separated during the subsequent or second cut. Such a cutting of a U or channel iron in a straight line or at an angle in two consecutive cutting operations involves the use of an upper and also a bottom cutter the web cutting portion of which is of a length at least equal to half of the height of the web of the U or channel iron. Cutters so proportioned have the advantage that one in the same group can be used for cutting U or channel irons having webs of different heights in two consecutive operations. Moreover, according to cutting apparatus as heretofore constructed, the deformation of the iron during the cutting operation is a disadvantage, the web portion which is separated or detached after the first cutting operation being still suspended or connected to the web and is bent off, because in such U or channel iron cutting devices with flat cutters, the U-iron or channel rests on the bottom cutter and on the lateral cutter, the upper cutter that is the only movable one, pressing away the unsupported portion of the iron from the said supported portion. The nearer the upper cutter approaches the other cutter, the greater will be the deformation. This deformation may be so great that the portion cut off can no longer be pulled back through the working opening of the angle cutter, the result being that the iron is practically useless.

The object of this invention is to avoid such a disadvantage, that is, it is the purpose to reduce or minimize as far as possible the deformation produced during the first cutting operation and to entirely eliminate such deformation during the subsequent cutting operation and, at the same time, it enables the cutting to be effected at the greatest possible angle. As the upper cutter is moved toward the lateral and bottom cutters only for a distance sufficient to separate the half of the U or channel iron, deformation of that half of the girder which is separated by the first cut is very small, and furthermore, during the second cutting operation, the slightly bent-off portion of the iron or girder finds a support on the bottom cutter and is re-shaped or straightened by the pressure exerted thereon by the upper cutter as it descends upon the upper side of the web. The result of such movement is, that in separating the U or channel iron, especially when cutting at an angle, neither the cutting-off portion nor the remaining section show any deformation at the point of cutting or separation, the cut surface being smooth and regular so that neither the cut-off portion nor the portion remaining requires any subsequent treatment before use.

Furthermore, according to the present invention, the cutting device is capable of cutting U or channel irons at any desired angle, even at an angle exceeding 45°, as the cutters have cutting edges of full thickness and width whereas the cutting devices heretofore used were provided with wedge-shaped cutters and owing to the reduction of the thickness of the cutting edges by reason of such wedge-shape, it was only possible to cut straight or at a small angle.

In the following drawing: Figures 1 and 2 are fragmentary detail views showing a U or channel iron or girder applied to cutters arranged and constructed in accordance with the present invention; Fig. 3 illustrates graphically the action of the cutter on the U or channel iron in making the first cut; Figs. 4 and 5 illustrate a machine embodying a complete set of cutters; Fig. 6 is a diagrammatic view showing the deformation of a girder when sheared by certain forms of cutting apparatus as heretofore known; Fig. 7 is a sectional view of a U or channel iron showing the tearing of the web due to the extreme deformation; Fig. 8 is a sectional view of the same channel iron showing the slight deformation which is caused, according to the present invention, during the first cutting operation; Fig. 9 illustrates the contour of the severed end of the U or channel iron as practiced by the present invention.

The angle cutting device constructed in accordance with the present invention is illustrated in the accompanying drawing as comprising an upper cutter $a$ which is movable obliquely and downwardly at an angle of 45° and having thereon the two cutting edges 1 and 3 arranged at right angles with respect to each other and having a width $b$ as shown in Figs. 1 and 2, such width being equal to or preferably slightly greater than half of the space between the flanges $c$, $c'$ of the U or channel girder $d$ to be cut. A lateral stationary cutter $e$ has a cutting edge 2, and a stationary bottom cutter $f$ has a cutting edge 4. The cutting edges 1, 2, 3 and 4 of the cutters $a$, $e$, and $f$, respectively, are situated in the same vertical plane A—B. The entire flat surfaces forming the cutting edges of the several cutters engage the girder to be cut.

Should it be desirable to cut a girder at an angle, for instance in the direction A—B, that is to say, at an angle $\beta$ shown in Fig. 1, the upper cutter $a$ engages with the flat surfaces of its cutting edges 1 and 3, with the left hand half of the web and the left hand flange $c$ of the U or channel iron $d$ which is supported by the stationary lateral cutter $e$ and the bottom cutter $f$ which is also stationary. During the oblique descending movement of the upper cutter in coöperation with the abutment provided by the bottom cutter, the left hand half of the web is acted upon to an extent equal to the width of the upper cutter, that is to say, during the first cut up to the point $y$ as shown in Figs. 1 and 3. When the upper cutter presses against the left hand half of the web and in an oblique direction, the right hand half of the web is still uncut, the web of the girder being consequently bent at the point $y$ where the upper cutter engages the web for, at that point, the material is still suspended or connected to the uncut portion of the web and as the upper cutter moves in an oblique direction, the material is thereby bent at $y$. This bending results in a certain deformation of the girder, the amount of deformation being proportional to the extent of the downward movement of the upper cutter. When said downward movement is such that the upper cutter passes the cutting edges of the lateral and bottom cutters completely, the deformation of the girder is so great that the girder with its partly cut portion cannot be withdrawn through the opening provided for the cutters, and the web is usually torn deeply because of the cut end falling off as shown diagrammatically in Fig. 6. According to the present invention, however, the oblique movement of the upper cutter is limited to such an extent that the U or channel iron is just separated at one side during the first cutting operation so that the deformation will be considerably less as shown in Fig. 8, Fig. 7 showing the extent to which the half first separated is torn in those cases where the cutters completely pass one another. The result shown in Fig. 8 is due to the fact that the cutters do not pass one another, but the severing is obtained by the pressure produced so that the remaining portion of the girder is bent less. The second cut which will completely sever or separate the two sections of the girder will completely neutralize the slight deformation which is produced by the first cutting operation. In order to more completely describe the cutting action, it might be stated that there are two possible ways of carrying out the second cut through the girder. Either the U or channel girder $d$ is reversed, that is to say, turned in a horizontal plane through an angle of 180° and then introduced into the same cutting device on which the upper cutter $a$ acts upon the portion of the web remaining, the cutting edge 1 in coöperation with the cutting edge 2 of the lateral cutter $e$, the flange $c'$ and the cutting edge 3 of the upper cutter $a$ being in coöperation with the cutting edge 4 of the bottom cutter $f$ for, owing to the reversal of the girder $d$, the flange $c'$ assumes the position previously occupied by the flange $c$. Instead of turning the girder, however, the cutting device may be turned to an angle of 180° after the girder has been withdrawn therefrom, the girder being again positioned whereby the cutters *a*, *e* and *f* assume the position shown in Fig. 2. The upper cutter *e* during its descent so operates as to cause its cutting edge 1 to engage the remaining uncut flange *c'* and coöperating with the cutting edge 2 of the lateral cutter *e* serves to separate this flange *c'*. The cutting edge 3 of the descending upper cutter *a* in coöperation with the cutting edge 4 of the bottom cutter *f* causes the remaining portion of the web from the point *y* to the flange *c'* to be severed. During the second cut, only the bent portion *w* of the U or channel girder finds support on the bottom cutter *f* as an abutment, and at that point *y* where the separation and consequently the bending started at the first cutting operation, and during the descent of the upper cutter, a pressure is exerted on the U or channel iron. In that way, the bending at the point *y* is completely neutralized, and that portion of the partially divided girder which is bent during the first cut, is re-bent into the plane of the girder. That portion of the girder on which the upper cutter rests during the second cut is not deformed at all, for in this case, a separating action only takes place.

Fig. 9 shows the shape of the U or channel-shaped girder after its separation by an apparatus constructed in accordance with the present invention, and it will be observed that there is no visible deformation.

Figs. 4 and 5 illustrate a girder cutter having four single groups of cutting devices in order to enable the girders or beams to be cut at reverse angles without requiring the girder to be turned over.

I claim as my invention:

An apparatus for shearing channel iron girders at different angles and in two consecutive operations comprising a suitable supporting frame provided with an opening shaped to receive a bar having the two lateral flanges up turned, a fixed lower cutter arranged to act upon the under side of the web, a fixed lateral cutter arranged to coöperate with one of said flanges, and an obliquely movable upper cutter, all of said cutters having rectangular cutting edges lying in the same plane, the upper cutter being of a width which is at least as great as half the width of the web, the oblique movement of the upper cutter being limited so that its lower cutting edge does not pass the coöperating cutting edge of the lower cutter whereby that portion of the web acted on shall be severed by the pressure exerted thereon by the upper cutter, the bottom cutter serving as a support during the second cutting operation for that portion of the web which is slightly deformed during the first cutting operation, whereby the deformation is neutralized.

In testimony whereof I have hereunto set my hand in presence of two subscribing witnesses.

HUGO JOHN.

Witnesses:
FRIEDRICH RITZE,
KARL HALECKER.